United States Patent [19]

Kirn

[11] 4,015,292

[45] Mar. 29, 1977

[54] ROTATABLE MULTIFACETED TAPE GUIDE FOR USE IN A CASSETTE

[75] Inventor: Thomas G. Kirn, Rochester, N.Y.

[73] Assignee: Eastman Kodak Company, Rochester, N.Y.

[22] Filed: Aug. 22, 1975

[21] Appl. No.: 606,995

[52] U.S. Cl. .............................. 360/130; 242/194; 360/85; 360/95

[51] Int. Cl.² .................... G11B 23/04; G11B 5/52; G11B 15/66

[58] Field of Search ............. 360/130, 85, 132, 84, 360/95; 242/194, 197–200, 55.19 A

[56] References Cited

UNITED STATES PATENTS

| | | | |
|---|---|---|---|
| 3,643,038 | 2/1972 | Sato | 360/85 |
| 3,665,120 | 5/1972 | Larkin | 360/85 |
| 3,672,603 | 6/1972 | Swain | 242/194 |
| 3,673,348 | 6/1972 | Larkin | 360/130 |
| 3,674,942 | 7/1972 | Sugaya et al. | 360/85 |
| 3,678,213 | 7/1972 | Sato | 360/85 |
| 3,681,539 | 8/1972 | Eibensteiner | 360/85 |
| 3,764,757 | 10/1973 | Inaga | 360/85 |
| 3,781,487 | 12/1973 | Swain et al. | 360/85 |
| 3,800,314 | 3/1974 | Sato | 360/85 |

Primary Examiner—Alfred H. Eddleman
Attorney, Agent, or Firm—R. Cody

[57] ABSTRACT

A rotatable guide having both a conical and a cylindrical surface on opposite sides thereof is provided, within a coaxial-reel cassette, for orienting a magnetic tape along two different tape paths, depending on whether the tape is wound within the cassette between the coaxial reels or is withdrawn from the cassette and wrapped around a helical recording drum. By providing such a guide, with appropriate selective orientation, the tape may be translated directly between the reels by means of the conical surface, or guidedly directed to and from the recording drum, about which it helically wraps, by means of the cylindrical surface.

12 Claims, 8 Drawing Figures

ROTATABLE MULTIFACETED TAPE GUIDE FOR USE IN A CASSETTE

CROSS-REFERENCE TO RELATED APPLICATIONS

The following applications are related to each other: U.S. patent application Ser. No. 607,002, filed Aug. 22, 1975, entitled "Multioriented Composite-Surface Tape Guide for Use in a Cassette," by Douglass L. Blanding; U.S. patent application Ser. No. 607,001, filed Aug. 22, 1975, entitled "Cutaway Tape Guide for Selectively Cooperating with a Capstan and Guiding a Tape," by Douglass L. Blanding; U.S. patent application Ser. No. 606,994, filed Aug. 22, 1975, "Yieldable, Coaxially-Driven Tape Wrapping Guides for Use in a Helical Tape Recorder," by Douglass L. Blanding.

BACKGROUND OF THE INVENTION

1. Field of the Invention

This invention relates in general to apparatus for guiding a tape through more than one tape path in a tape recorder; more particularly, the invention is concerned with guides, mounted in a "coaxial-reel" tape cassette, for guiding magnetic tape through more than one tape path, including one path which is so disposed in the tape recorder that a television signal train may be helically recorded on the tape.

2. Description Relative to the Prior Art

While it is not so restricted, the invention acquires a special significance when it is used to guide magnetic tape contained in a coaxial-reel cassette toward and away from a helical recording drum in a video tape recorder. Coaxial-reel cassettes will usually have a pair of inclined or tapered guide posts which are so oriented so as to take up the change in the tape level between the reels when the tape, fully contained in the cassette, passes directly from one reel to the other.

For helical recording, the tape is initially pulled from the cassette and wrapped around the recording drum at a helix angle. In addition, the helical recording format requires precise positioning of the span of tape which passes around the drum; positioning errors may cause, for example, mistracking during playback. Tracking problems are diminished, however, if the tape follows a precise path into, around, and out of the drum assembly. In what has become one frequently used video recorder configuration, the paths into and out of the drum are horizontal and substantially in the same plane as the supply and takeup reels, respectively. The last post before the tape touches the drum and the first post after the tape leaves the drum are designed to change the tape's horizontal level a few degrees so as to dispose the tape properly to form a helix around the drum.

The combination of the coaxial-reel cassette with the helical recorder is hampered significantly because the tape presented to the helical drum is last touched within the cassette by the inclined or tapered guide posts. What this means is that the last guide surfaces within the cassette will tend to force the tape into an inclined path which is not suitable for presentment to the drum assembly and its associated guides. On the other hand, the tape still needs to be positively guided to the vicinity of the drum at the correct height for proper helical scanning. In an attempt to meet this problem, a multiplicity of guides are commonly mounted on the recording deck to positively guide the tape intermediate the cassette and the drum. The guides gradually compensate for the abrupt level change between the coaxial reels and finally present the tape at a suitable angle to the drum assembly. While perhaps expedient for a large machine, the size of such a guiding assembly, as dictated by the length of the tape passing therethrough, limits efforts to reduce the bulkiness of the typical video tape recorder.

Tape guiding configurations have heretofore been proposed which include guiding assemblies within the cassette that provide a tape path favorable to forming a helix around the recording drum when the tape is pulled from the cassette; in addition, such guides still take up the change in the level between the reels when the tape is totally contained inside the cassette. In one such design, several guide pins are provided in one corner of a coaxial cassette — two obliquely disposed pins and a vertical pin. The tape is directed across the two oblique pins to take up the level change between reels when the tape is totally contained within the cassette. When the tape is drawn out of the cassette, it is first tilted by one oblique pin, rides free of the other oblique pin, and finally is uprighted by the vertical pin, e.g., U.S. Pat. No. 3,800,314. Although the tape may be potentially presented to the drum along a suitable path, the sideways flip-flop of the tape within the cassette can only serve to introduce unwanted distortional transients. Other designs less susceptible to distortion tend to occupy too much space within the cassette. Two cylindrical guides, one canted with respect to the coaxial reels, have been spaced apart in a corner of a cassette, e.g., U.S. Pat. No. 3,672,603. When the tape is withdrawn from the cassette, it rides away from the canted guide and is directed only by the upright guide.

In a somewhat different approach, one configuration proposed includes a spring-loaded guide mounted in a coaxial cassette to transfer tape from one reel to the other, e.g., U.S. Pat. No. 3,678,213. When the cassette is dropped into place on a recorder, a tapered fixed pin mounted on the recorder displaces the spring-loaded guide upward so that magnetic tape riding thereon slides over to the fixed pin. The taper of the fixed pin is such as to alter the direction of tape travel to aid in wrapping the tape around the recording drum. This approach, in effect, provides for the substitution of one guiding surface for another within the cassette. However, this changeover is forced to occur whenever the cassette is placed on the recorder. Such a situation hampers certain operations, such as fast forward or rewind, which may best be accomplished with least damage to the tape by first unwrapping the tape from the drum and letting it wind back into the cassette; than a surface represented by the spring-loaded guide should be in place in order to prevent a buildup of distortional forces on the tape caused by its rapid passage over a surface not suited to the level change between the reels.

SUMMARY OF THE INVENTION

With regard to guiding a magnetic tape within a coaxial-reel cassette so as to use it with a helical recorder, a two-fold objective needs to be considered. First, there must be provision for directing the tape to the vicinity of the recording drum with a tape orientation suitable for forming a helix around the drum. Second, the tape, when unwrapped from the drum and totally contained within the cassette, must be oriented from the level of one reel to the level of the other reel.

As a rule, these two objectives are at odds with each other, since a different guiding surface is best adapted to meet the needs and requirements of each. Recognizing the desirability of meeting these objectives with a minimal addition to cassette structure, this invention basically proposes a tape guide post so disposed within a coaxial cassette that it presents a first guiding surface to the magnetic tape when the tape passes directly between the coaxial reels without encountering the recording drum, and interchanges the first surface with a second guiding surface when the magnetic tape passes from the cassette to the recording drum and therefrom back to the cassette. The first surface is tapered so that the path of the tape is altered from the level of the one coaxial reel to that of the other; the second surface is upright so that the tape is presented to the drum and its associated guides at a proper orientation to form a helix angle. In practice, a portion of a right circular cone forms the first surface, while a portion of a right circular cylinder form the second surface. In the preferred form, the post is made rotatable whereby the surfaces may interchange position relative to the tape.

In another key aspect of this invention, the post is so disposed within the cassette that interchange between the first and second guiding surfaces can occur only at that point in time when the tape is being wrapped around the drum for purposes of helical recording. This emphasis on timing ensures that the most suitable guide surface will be presented at the most suitable time; namely, a cylindrical surface is presented during recording operations while a conical surface is presented whenever the fast forward or rewind mechanism is engaged.

BRIEF DESCRIPTION OF THE DRAWINGS

The invention will be described with reference to the figures, wherein.

DESCRIPTION OF THE PREFERRED EMBODIMENTS

Because helical tape recorders are well known, particularly in connection with video recording, the present description will be directed in particualr to elements forming part of, or cooperating more directly with, the present invention. Recorder elements not specifically shown or described herein may be selected from those known in the art.

Figure 1:
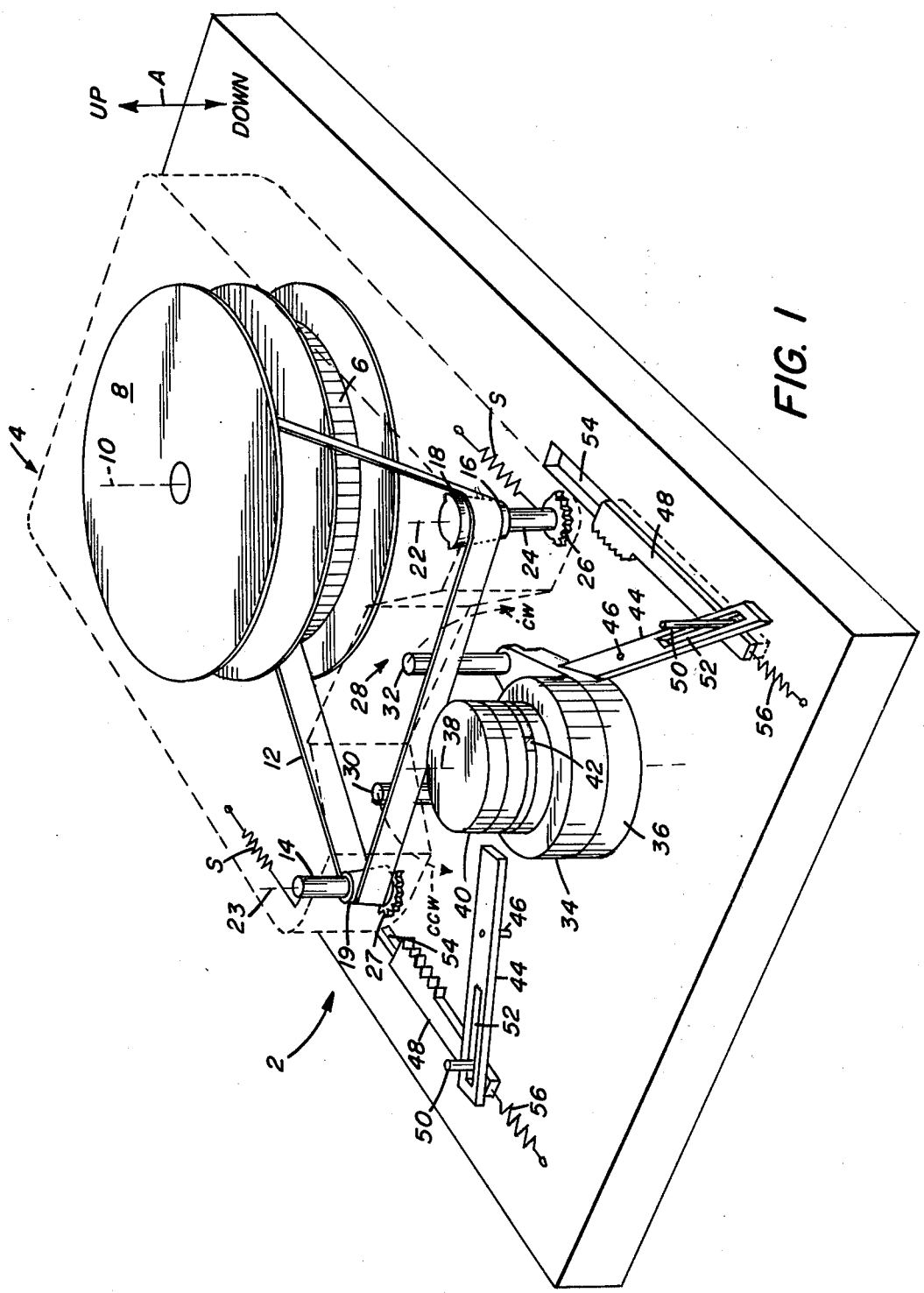
FIG. 1 is a perspective view of an embodiment of the invention.

Referring specifically to FIG. 1, there are shown the parts of a helical video recorder which are sufficient for an understanding of the present invention. A helical tape recorder 2 is provided with space on its playing deck for accepting a coaxial cassette 4 (shown in broken lines). A supply reel 6 and a takeup reel 8 are coaxially disposed with relation to each other and rotatably mounted within the cassette 4 about an axis 10.

Figure 4:
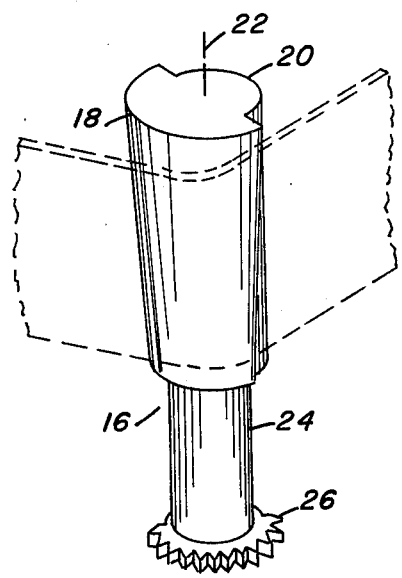
FIGS. 4 and 5 are perspective views of the positions of one of the tape guides illustrated in FIG. 1 and corresponding to the positions pictured in FIGS. 2 and 3, respectively.
Figure 5:
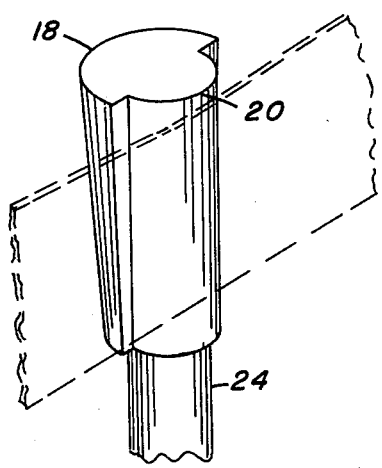

A magnetic tape 12 leaves the supply reel 6 and psasses across guides 14 and 16 during the course of its travel to the takeup reel 8. As better shown in FIG. 4, the guide 16 has two tape-contacting surfaces formed thereon: a conical surface 18 formed from a right circular cone with its apex pointing "down" and a cylindrical surface 20 formed from a right circular cylinder. Both surfaces have axes defined by a line 22. The guide 16 has a shank portion 24 which ends in a pinion 26 which cooperates with gearing on the playing deck as hereinafter described. The guide post 16 is rotatably mounted within the cassette 4 so that it may turn about the axis 22 when the pinion 26 is engaged.

A conical surface 19 and a cylindrical surface 21 are also provided on the guide post 14 which is also rotatable for purposes of guiding the tape 12. The cylindrical surface 21 is similar to the cylindrical surface 20 described heretofore in connection with the guide post 16 except it is oriented in line with the supply reel 6. The conical surface 19 is also similar to the conical surface 18 described heretofore except that it has an apex which points "upward" in the cassette. (The "up" and "down" directions as employed herein are depicted by the arrow A.) Additionally, the conical surface 19 is oriented to receive the tape 12 along the level of the supply reel 6. The guide 14 also has a pinion 27 which cooperates with gearing on the recorder to turn the guide post 14 about an axis 23 when the pinion 27 is engaged. Springs S, schematically depicted in FIG. 1, rotationally bias the guide posts 14, 16 so that they present their respective conical surfaces 19, 18 for cooperation with the tape when the cassette 4 is not within the recorder 2.

Referring again to FIG. 1, the cassette 4 has a cut-away front face 28, hereinafter sometimes referred to as a window, which is so designed as to permit the positioning of a pair of tapered threading guides 30 and 32, also referred to as tape wrapping guides, behind the tape 12. The threading guides 30 and 32 are mounted on drive gearing, not specifically described but generally designated by plates 34 and 36, respectively, for rotational movement (directions CW and CCW) around an axis 38. A recording drum 40, carrying at least one recording head 42, is rotatable about the axis 38. The path of the head 42 is slanted with respect to the tape 12 so that helical recording may take place when the tape 12 is wrapped around the drum 40 by the movement of the guides 30 and 32 (to be later described). Substantially identical levers 44 are pivoted on either side of the drum 40 upon the pivots 46. The rack 48 have pins 50 mounted thereon which engage the slots 52 in the levers 44. The racks 48 are constrained to move within tracks 54 in the recorder playing deck under the return force of springs 56.

Figure 2:
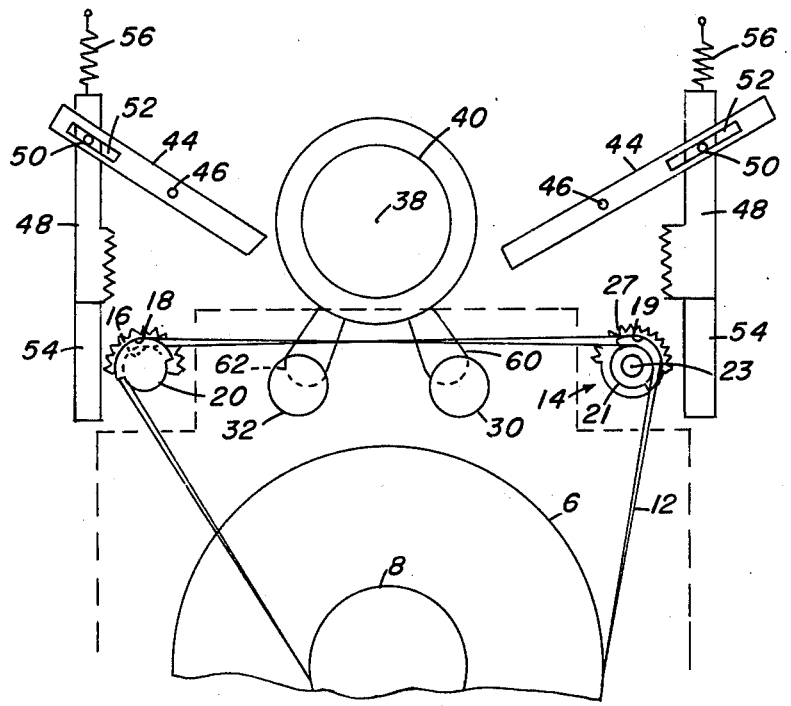
FIGS. 2 and 3 are fragmentary top views of two positions of the apparatus as pictured in FIG. 1.
Figure 3:
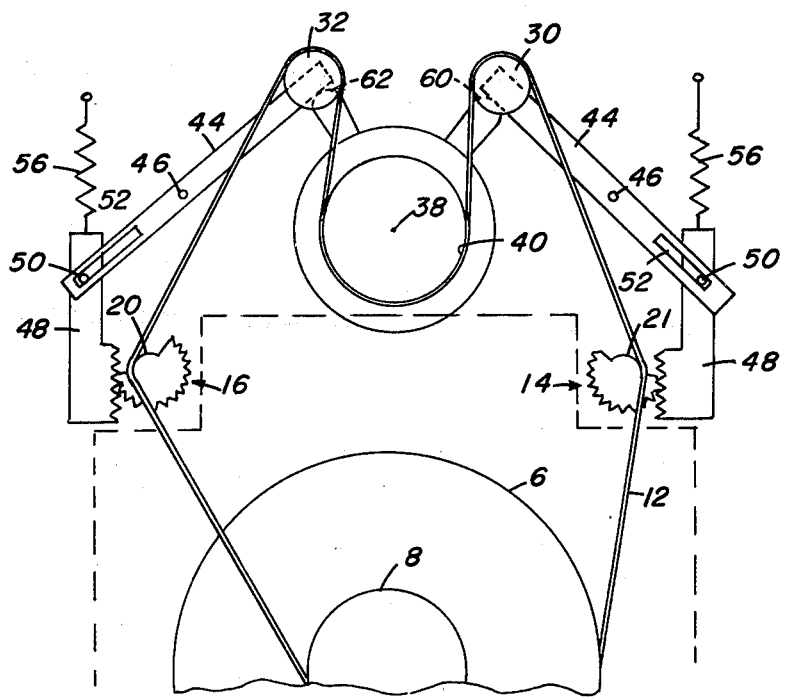

FIGS. 2 and 3 illustrate the two modes of operation of the embodiment of FIG. 1. FIG. 2 shows the apparatus in a position as depicted in FIG. 1 wherein the tape passes across the guides 14 and 16 from the supply reel 6 to the takeup reel 8. Each guide 14 and 16 presents a conical surface 19 and 18, respectively, to the tape which differ only in that their apices are inversely disposed with respect to each other. The apex of the conical surface 18 on the guide 16 is pointing downward while the apex of the conical surface 19 on the guide 14 is pointing upward. This orientation of the conical surfaces causes the tape to change its level upward toward the guide 16 when it passes around the guide 14. The guide 16 in turn cancels the inclination of the tape 12 so that it is oriented along the level of the takeup reel 8.

To commence the recording operation, the tape threading guides 30 and 32 rotate about the axis 38 and the drum 40 until they reach a threaded position, as depicted in FIG. 3. A suitable drive means (not shown) rotates the tape threading guides 30 and 32 from the unthreaded mode to the threaded mode, as illustrated in FIGS. 2 and 3, respectively, whereat a suitable switch or control unit will disable the drive means. The reverse operation, from the threaded to the unthreaded mode, may be accomplished by reverse gearing (also not shown).

As the tape threading guides 30 and 32 rotate about the drum, cam surfaces 60 and 62 on the guides 30 and 32 engage the ends of the levers 44 and thereby rotate the levers 44 about their pivots 46. The force thereby generated is transmitted to the pins 50 and therefrom to the racks 48. The racks in turn are constrained to slide through the tracks 54 until the gear teeth on the racks 48 engage the gear teeth on the pinions 26 and 27. Thereupon, the guides 14 and 16 are rotated sufficiently such that the conical surfaces 19 and 18 are driven away from the tape 12 while the cylindrical surfaces 21 and 20 are presented to the tape. When passing around the cylindrical surface 21 of guide 14, the tape 12 remains at the same level as that of the supply reel 6. As a result, the span of tape between the guide 14 and the threading guide 30 will be at a suitable orientation for introduction into the helix surrounding the drum 40. Likewise, the span of tape exiting from the helix and repositioned by the threading guide 32 will be presented to the cassette 4 substantially in the level of the takeup reel 8. The cylindrical surface 20 on the guide 16 will guide the tape 12 into the supply reel 8 without affecting the level of the tape path. As the tape threading guides 30 and 32 reverse their movement and the tape 12 is unthreaded from the drum, the springs 56 urge the racks 48 away from the cassette 4 along the tracks 54. During this movement, the pinions 26 are reverse rotated back to their former positions whereat the conical surfaces 18 and 19 are again presented to the tape. The tape 12 is now in position for fast forwarding or rewinding; alternatively, the cassette 4 may now be removed from the recorder 2.

Figure 7:
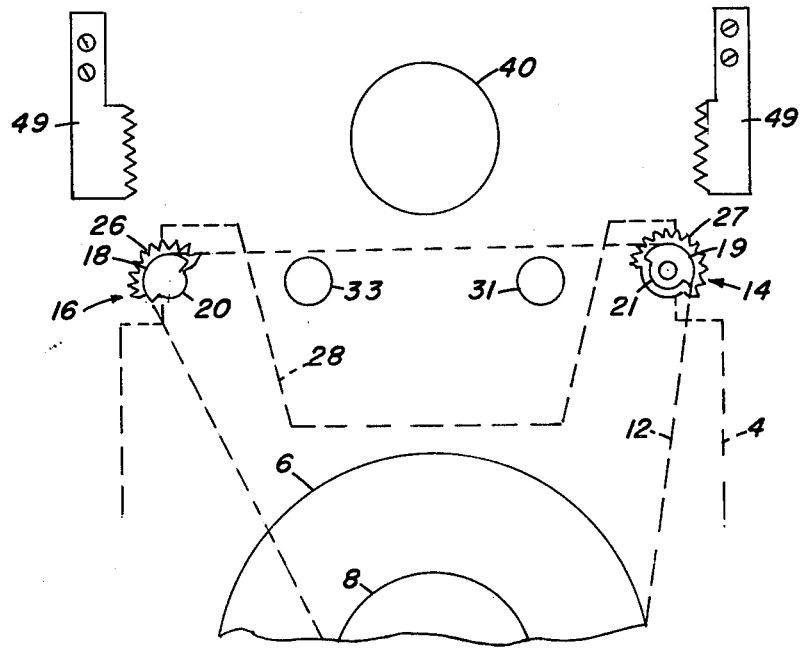
FIGS. 7 and 8 are fragmentary top view of two positions of the apparatus pictured in FIG. 6.
Figure 8:
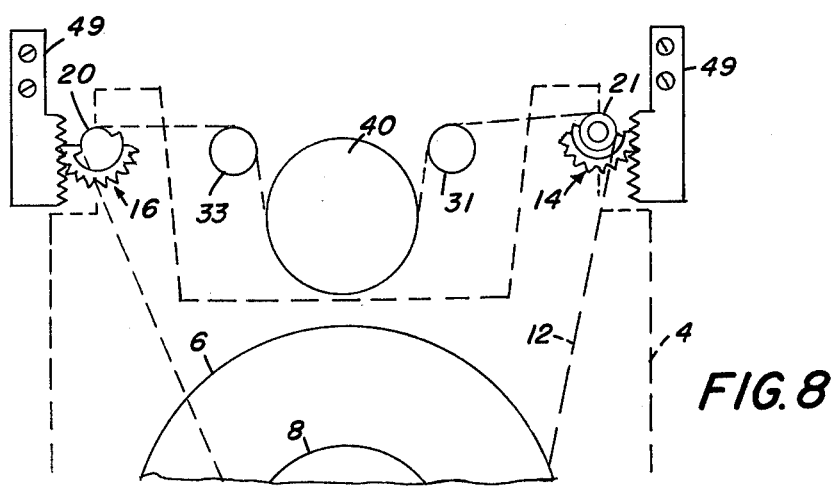
Figure 6:
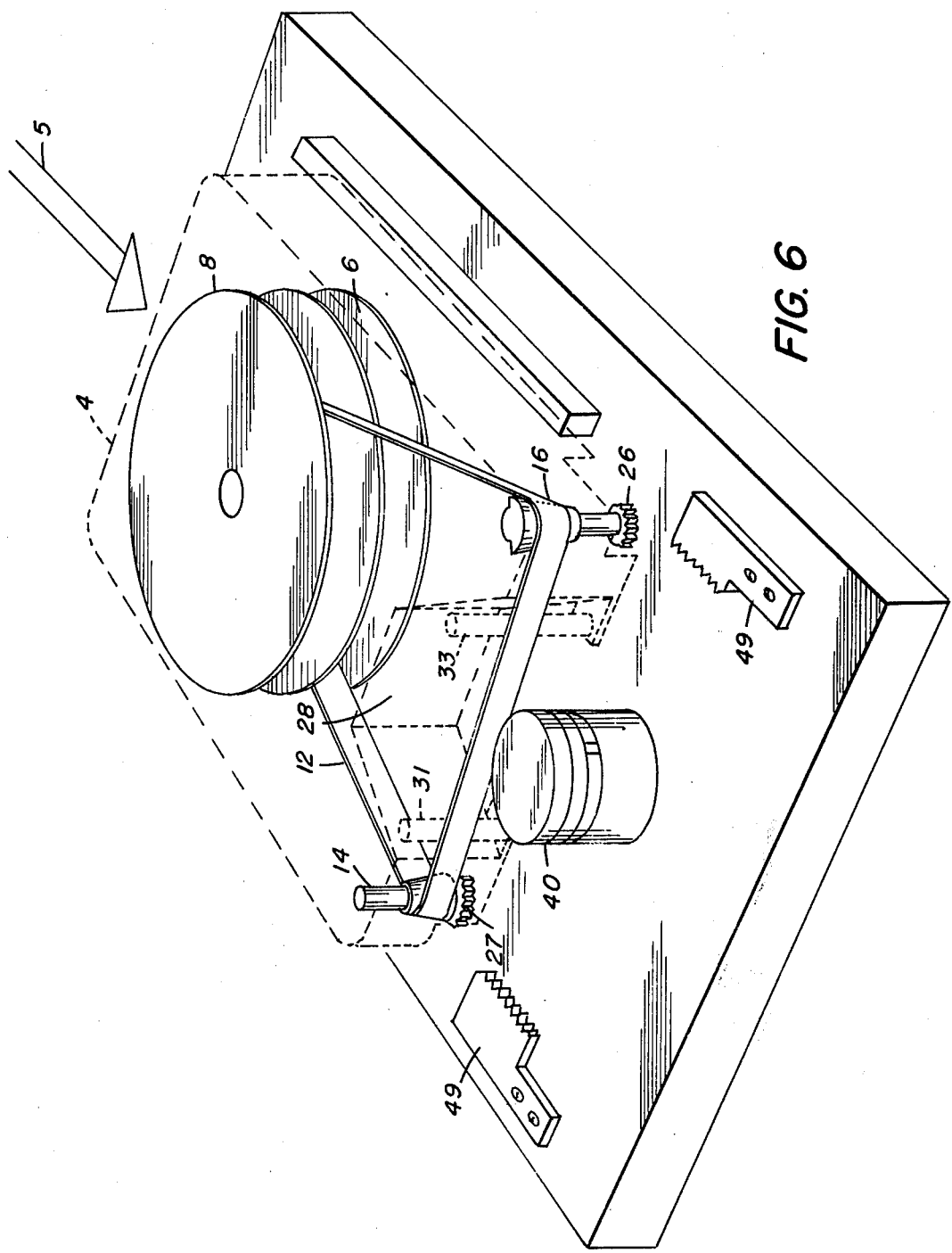
FIG. 6 is a perspective view of another embodiment of the invention.

Referring now to FIGS. 6 through 8, there is shown an alternate embodiment of the invention wherein the major difference lies in how the tape 12 is wrapped around the drum 40 and in how this wrapping action is correlated to the rotation of the cassette guides 14 and 16. Threading guides 31 and 33 are permanently mounted within the cassette 4. The racks 49 are fixed to the recorder deck. Initially, as illustrated in FIG. 7, the conical surfaces 19 and 18 on the guides 14 and 16 are presented to the tape 12 so that the level change is taken up between the supply reel 6 and the takeup reel 8. When the cassette 4 is moved in the direction of arrow 5 (by hand motion, for exsmple), the cut-away portion 28 of the cassette 4 is moved relative to the drum 40 until the drum 40 begins to penetrate the space between the threading guides 31 and 33. As this begins to happen, the tape 12 is guided around the drum 40 by the threading guides 31 and 33. Simultaneously, the racks 49 engage the pinions 27 and 26 on the rotatable guides 14 and 16. The guides 14 and 16 are thereupon rotated until the cylindrical surfaces 21 and 20 are disposed adjacent the tape 12 and the position described by FIG. 8 is assumed.

The invention has been described in detail with particular reference to preferred embodiments thereof, but it will be understood that variations and modifications can be effected within the spirit and scope of the invention.

What is claimed is:

1. For use in a tape cassette of the type having first and second rotatable reels, said cassette being useful with a helical scan recorder, and said cassette having a window out of which tape may be withdrawn and helically wrapped around a recording drum, the cassette further having at least one guide post disposed in the path of travel of the tape as it passes from one of the reels to the other, the improvement:
   a. Wherein the post comprises first and second guiding surfaces provided on said post, said first surface being part of a cylinder and said second surface being part of a cone, said post being mounted for rotation within said cassette and being so oriented that tape passes around said second surface when the tape is not withdrawn out of the cassette window; and
   b. wherein said cassette includes means for rotating the first surface of said post into guiding contact with said tape when said tape is withdrawn through the cassette window.

2. A cassette, for use in a tape recorder of the type wherein magnetic tape from a cassette is directed around a recording drum which supports recording heads which helically scan the tape, said cassette having a supply reel and a tapeup reel coaxially mounted with respect to each other, whereby tape is supplied by the supply reel at a first level and taken up by the takeup reel at a second level, the cassette further having at least one guide post located within the cassette for guiding the tape when the tape is directed around the recording drum, said post comprising:
   a cylindrical surface on the post for orienting the tape toward the recording drum;
   a conical surface so disposed on the post relative to said cylindrical surface that said conical surface makes substantially no contact with said tape when said tape contacts said recording drum; and
   said cassette embodying means for rotating the post whereby said cylindrical surface is moved away from the tape and said conical surface is moved into contact with the tape, said conical surface orienting the tape between the first and second levels to take up the level change between the coaxial supply and takeup reels.

3. The apparatus as claimed in claim 2 wherein said means for rotating the post is adapted for rotation by means forming part of said tape recorder.

4. For use in a helical scan video tape recorder of the type wherein tape is helically wrapped around a recording drum by the wrapping action of at least one tape threading guide, the tape being supplied by two coaxial reels in a cassette, the tape threading guide being adapted to engage the tape and alter its path from between the reels to a wrapping disposition around the drum, the cassette being provided with at least one guide post disposed in the cassette to guide said tape between the respective levels of said coaxial reels, the improvement:
   a. wherein the post comprises first and second contiguous parts, said first part being so positioned on the post that said first part guides the tape between the levels of the coaxial reels when the tape is not engaged by the tape threading guide, said second part being so positioned on the post that said second part guides the tape when the tape threading guide engages the tape, alters its path, and wraps it around the drum; and b. wherein said cassette includes means for rotating the post so that said first and second contiguous parts interchange their positions adjacent the tape.

5. The apparatus as claimed in claim 4 wherein said first part comprises a part of a circular cone and said second part comprises a part of a cylinder, said cone and cylinder having a common axis.

6. For use in a helical scan video tape recorder of the type wherein a magnetic tape is helically wrapped around a recording drum by at least one movable tape wrapping guide, wherein the tape is wound between two coaxial reels in a cassette and across an open window therein, wherein the tape wrapping guide is adapted to withdraw the tape from the cassette through the window and to wrap the tape around the recording drum, wherein the cassette has at least one post mounted therein to guide the tape either directly between the reels or through the window, the improvement wherein the post comprises:

first and second parts, said first part having a guiding surface which is so disposed within said cassette as to guide the tape between the reels when the tape is not withdrawn through the window, said second part having a second guiding surface for guiding the tape when the tape threading guide withdraws the tape from the cassette through the window; and wherein said cassette includes means for interchanging said second part for said first part when said tape is withdrawn through said window.

7. The apparatus as claimed in claim 6 wherein said guiding surface of said first part is formed from a right circular cone and said guiding surface of said second part is formed from a right circular cylinder.

8. A cassette for use in a helical scan video tape recording comprising:

a first reel for providing a length of magnetic tape;

a second reel coaxially mounted with respect to said first reel for taking in said length of magnetic tape;

at least one guide mounted in the cassette and over which said length of magnetic tape passes, said guide having a first and a second surface, said first guiding surface comprising a section of a right circular cone and said second guiding surface comprising a section of a right circular cylinder;

a window in the cassette for withdrawing said tape therethrough; and means for rotating said post whereby said first guiding surface is presented to said tape when said tape is not withdrawn through said window and whereby said second guiding surface is presented to said tape when said tape is withdrawn through the window.

9. In combination with a cassette of the type useful with a helical scan video recorder, said cassette having a pair of coaxial reels, said reels having a span of tape extending therebetween, and said cassette further having a window across or through which said tape is adapted to extend or be withdrawn, a. a guide post supported for rotation within said cassette, said post having first and second differently shaped surfaces for guiding said tape, respectively, across said window and when said tape is withdrawn through said window;

b. means for biasing the rotation of said post for cooperation of said first guide surface with said tape; and c. means for rotating, against said bias, said post for cooperation of said second guide surface with said tape.

10. The apparatus of claim 9 wherein said first and second surfaces are, respectively, substantially conical and cylindrical.

11. The apparatus of claim 9 including:

a. a second guide post having first and second differently shaped guiding surfaces for guiding said tape respectively across said window and when said tape is withdrawn through said window;

b. means for biasing the rotation of said second post for cooperation of its first guide surface with said tape; and c. means for rotating, against its bias, said second post for cooperation of its guide surface with said tape.

12. In combination with a cassette of the type useful with a helical scan video recorder, said cassette having a pair of coaxial reels, said reels having a span of tape extending therebetween, and said cassette further having a window across or through which said tape is adapted to extend or be withdrawn, a. a guide post supported for rotation within said cassette, said post having first and second differently shaped surfaces for guiding said tape, respectively, across said window and when said tape is withdrawn through said window; and b. means for rotating said post for selective cooperation of either said first or second guide surfaces with said tape.

* * * * *